US005195373A

United States Patent [19]

Light et al.

[11] Patent Number: 5,195,373

[45] Date of Patent: Mar. 23, 1993

[54] ULTRASONIC TRANSDUCER FOR EXTREME TEMPERATURE ENVIRONMENTS

[75] Inventors: Glenn M. Light; Richard A. Cervantes, both of San Antonio, Tex.; David G. Alcazar, Madrid, Spain

[73] Assignee: Southwest Research Institute, San Antonio, Tex.

[21] Appl. No.: 686,694

[22] Filed: Apr. 17, 1991

[51] Int. Cl.[5] .......... G01N 29/24

[52] U.S. Cl. .......... 73/632; 367/173; 367/188; 310/327; 310/336; 73/866.5; 73/644

[58] Field of Search .......... 73/632, 866.5, 431, 73/644; 367/173, 188; 310/327, 336

[56] References Cited

U.S. PATENT DOCUMENTS 3,821,834 7/1974 McElroy .......... 310/327
4,482,835 11/1984 Bar-Cohen et al. .......... 310/327
4,567,770 2/1986 Rumbold et al. .......... 73/644
4,703,656 11/1987 Bhardwaj .......... 73/644

OTHER PUBLICATIONS

Nondestructive Evaluation Science & Technology, a publication of Southwest Research Institute, San Antonio, Tex., vol. 5, No. 1, Jul., 1989.

*Primary Examiner*—Hezron E. Williams
*Assistant Examiner*—Rose M. Finley
*Attorney, Agent, or Firm*—Baker & Botts

[57] ABSTRACT

An ultrasonic piezoelectric transducer that is operable in very high and very low temperatures. The transducer has a dual housing structure that isolates the expansion and contraction of the piezoelectric element from the expansion and contraction of the housing. Also, the internal components are made from materials having similar coefficients of expansion so that they do not interfere with the motion of the piezoelectric element.

10 Claims, 2 Drawing Sheets

ULTRASONIC TRANSDUCER FOR EXTREME TEMPERATURE ENVIRONMENTS

NOTICE: The U.S. Government has a paid-up license in this invention and the right in limited circumstances to require the patent owner to license others on reasonable terms as provided for by the terms of Project No. 15-2236 for the Department of Energy (D.O.E.).

TECHNICAL FIELD OF THE INVENTION

This invention relates to ultrasonic test equipment, and more particularly to an ultrasonic transducer designed to operate in extreme temperature environments, such as space.

BACKGROUND OF THE INVENTION

Ultrasonic transducers permit transmission or detection of ultrasonic waves, at a variety of frequencies. They are, typically, piezoelectric pressure-sensing devices, especially manufactured to have a resonant frequency within the ultrasound range.

Conventional ultrasonic transducers are designed for use in well controlled environments, such as those that are tolerable for a human operator. In many applications, this is not a restriction, and permits the transducer design to be simple. However, these transducers tend to fail under high and low temperature extremes. The piezoelectric element of the transducer will not withstand them.

A need exists for an ultrasonic transducer that will operate at extreme temperatures. Such transducers have particular application for nondestructive testing in harsh environments. Examples are testing space equipment and structures, or cryogenic container testing.

SUMMARY OF THE INVENTION

The invention is a transducer for use with ultrasonic test equipment. A piezoelectric element generates or receives pressure waves. A backing behind the piezoelectric element controls the energy dissipation of the piezoelectric element. An inner housing contains the back and sides of the piezoelectric element and the backing. The piezoelectric element, the backing, and the inner housing are made from materials having similar coefficients of expansion. A filler surrounds the sides and back of the inner housing, and an outer housing surrounds the sides of said filler. The dual housing structure and the matched coefficients of linear thermal expansion permit the piezoelectric element to expand and contract without being restricted, and thus prevents transducer failure.

A technical advantage of the invention is that it is operable in extreme temperatures. The transducer has a dual housing and uses thermal-expansion coefficient compensation, which permits the various internal components to contract or expand without breaking the transducer.

DETAILED DESCRIPTION OF THE INVENTION

Figure 1:
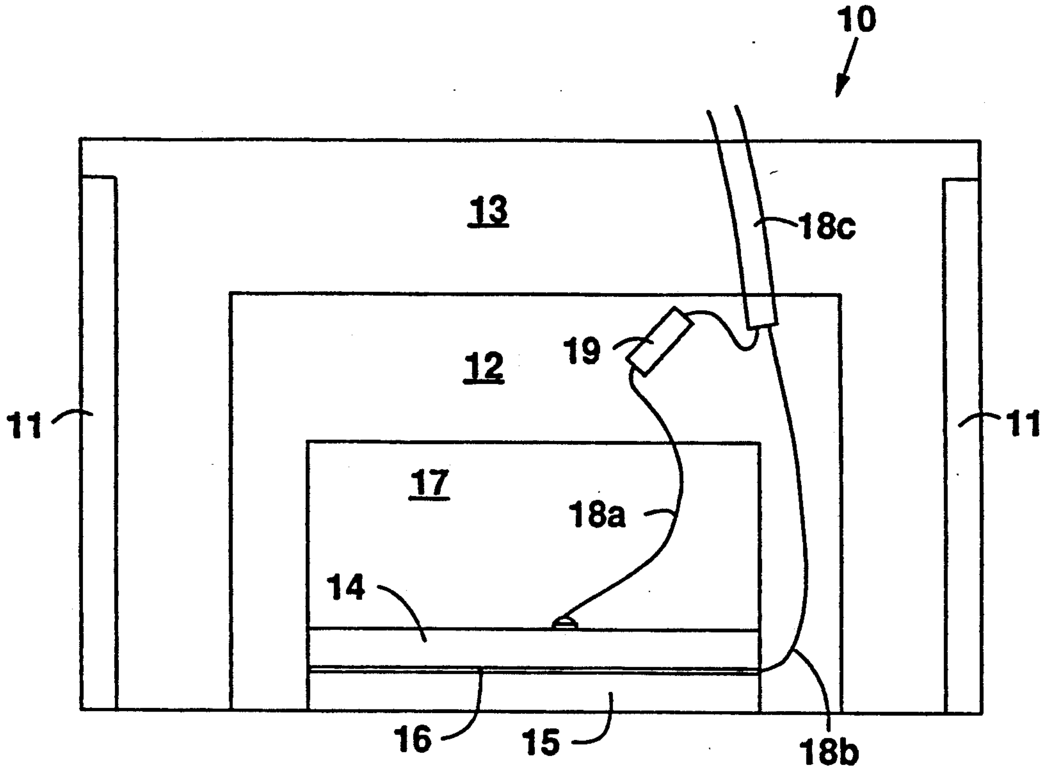
FIG. 1 is a cross sectional view of the transducer.

FIG. 1 is a cross sectional view of the ultrasonic transducer 10, constructed in accordance with the invention. Although this description is in terms of a transducer 10 that receives and generates ultrasonic pressure waves, other pressure waves may be received and generated if the piezoelectric characteristics are appropriate.

Figure 2:
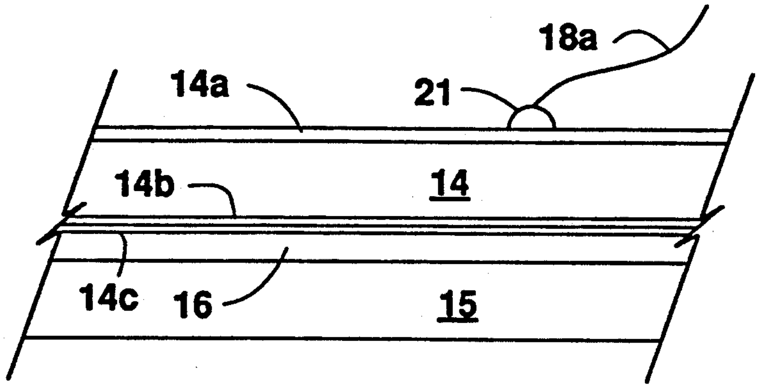
FIG. 2 is a detailed view of the wearface, piezoelectric element, and bond layer of the transducer.

The main components of the transducer 10 are an outer housing 11, inner housing 12, filler 13, piezoelectric element 14, wearface 15, bond layer 16, backing 17, electrical connecting means 18, and inductor 19. FIG. 2 is a more detailed view of piezoelectric element 14, wearface 15, and bond layer 16.

For purposes of this description, piezoelectric element 14, wearface 15, bond layer 16, and backing 17 are referred to as the "internal components". As explained below, a feature of the invention is the use of thermal-expansion coefficient compensation, such that expansion and contraction of the internal components is isolated from the effects of expansion and contraction of outer housing 11 due to environmental conditions.

In the preferred embodiment, transducer 10 is cylindrically shaped, although other shapes may be used. As explained below, outer housing 11 surrounds the other components. Wearface 15 comprises the front surface of transducer 10, and filler 13 comprises the back surface. For purposes of example, a typical transducer 10 is approximately 1 inch high and 1 inch in diameter, with the size of the various components being in the same general relative dimensions as is indicated in FIG. 1.

Piezoelectric element 14 is the active element of transducer 10. It either generates ultrasonic pressure waves after being electrically excited at a high frequency, or generates high frequency electrical pulses after being excited with ultrasonic pressure waves.

Piezoelectric element 14 is made from a ceramic material having piezoelectric characteristics, manufactured in accordance with known techniques. It has the shape of a flat plate, which is a standard configuration for ultrasonic transducer applications. Consistent with the cylindrical shape of transducer 10, piezoelectric element 14 is disk shaped. As used herein, the "front surface" of piezoelectric element 14 is the surface closest to the front of transducer 10.

As shown in FIG. 2, piezoelectric element 14 has a conductive coating **14*a* and 14*b* on each side. A ribbon conductor 14*c* may added for connection to electrical lead 18*b*. An electrical lead 18*a* is attached to the back of piezoelectric element 14 by any standard means, for example, a high temperature solder point 21**.

Referring to both FIGS. 1 and 2, wearface 15 is attached to the front surface of piezoelectric element 14, by means of bond layer 16. Wearface 15 is a thin and flat plate, which makes contact with the material under inspection and protects piezoelectric element 14 from abrasion or impact damage. Wearface 15 is made from a ceramic material having a coefficient of expansion similar to that of piezoelectric element 14.

Bond layer 16 bonds wearface 15 to the front surface of piezoelectric element 14. Bond layer 16 is a thin layer of epoxy. In the preferred embodiment, Araldyte epoxy, is used, although other two-part epoxies having low viscosity could be used. The thickness of bond layer 16 is generally less than 0.001 inch, and is made as thin as possible to prevent the coefficient of expansion of the epoxy material from interfering with the expansion and contraction of the internal components. This may be accomplished during manufacture of transducer 10 by heating the material to be used for bond layer 16, applying the material between wearface 15 and the piezoelectric element 14, and applying pressure against the outer surface of the combination.

Backing 17 is placed behind piezoelectric element 14, and controls its energy dissipation, i.e., its Q. Backing 17 is made from a ceramic mixture, which can be poured directly into a mold onto piezoelectric element 14 and does not require firing. This ceramic material forms a bond with piezoelectric element 14 and has thermal expansion properties similar to those of the material used for piezoelectric element 14. Backing material is mixed with powdered tungsten to improve the overall mechanical damping properties. Sufficient water or other liquid is added to this mixture to permit it to be poured into a mold. A 1:2 ratio, by weight, of ceramic material to tungsten is preferred.

Inner housing 12 surrounds the sides and back of the internal components, i.e., piezoelectric element 14, wearface 15, and backing 17, and encloses them. Inner housing 12 is made from a ceramic material, cast around the internal components. Thus, there may be space between the back of backing 17 and inner housing 12, so that any expansion and contraction of the internal components is not restricted. Alternatively, a pliable filler could be placed between inner housing 12 and backing 17.

A feature of the invention is that piezoelectric element 14, inner housing 12, and backing 17 have similar coefficients of thermal expansion. Thus, the expansion and contraction of piezoelectric element 14 is not interfered with by movement of other components. Typical ranges for thermal expansion coefficients are $1\text{-}4\times10^{-6}$ for lead zirconium titanate and $0.5\text{-}3\times10^{-6}$ for lead metaniobate (in./in.C°).

Filler 13 surrounds the sides and back of inner housing 12. Filler 13 is made from a pliable material, such as a silastic material, so that the effect of any expansion and contraction of outer housing 11 on inner housing 12 are damped.

Outer housing 11 may be any material suitable for the environment, i.e., a material whose expansion and contraction does not have an adverse effect on the operation of transducer 10. In the preferred embodiment, outer housing 11 is made from an epoxy material that is resistant to high temperature, such as Vespel. However, a feature of the invention is that filler 13 and inner housing 12 isolate the expansion and contraction of the internal components from that of outer housing 11, such that adverse effects on the operation of transducer 10, which might otherwise be caused by expansion and contraction of outer housing 12 are reduced.

Electrical connection means 18 comprises a first connector lead **18*a* and a second connector lead 18*b*, which are each attached to a conductor on respective sides of piezoelectric element 14. The means of attachment is a high temperature solder. As stated above, first connector lead 18*b* may be attached to a ribbon conductor 14*c*. Connector leads 18*a* and 18*b* may be placed within a coaxial cable 18*c* to facilitate signal transmission to remote test apparatus. Ideally, leads 18*a* and 18*b*** are teflon insulated.

Inductor 19 is placed within transducer 10, such as by being placed within inner housing 12. The purpose of inductor 19 is to adjust the measuring properties of transducer 10, in accordance with known techniques.

Figure 3:
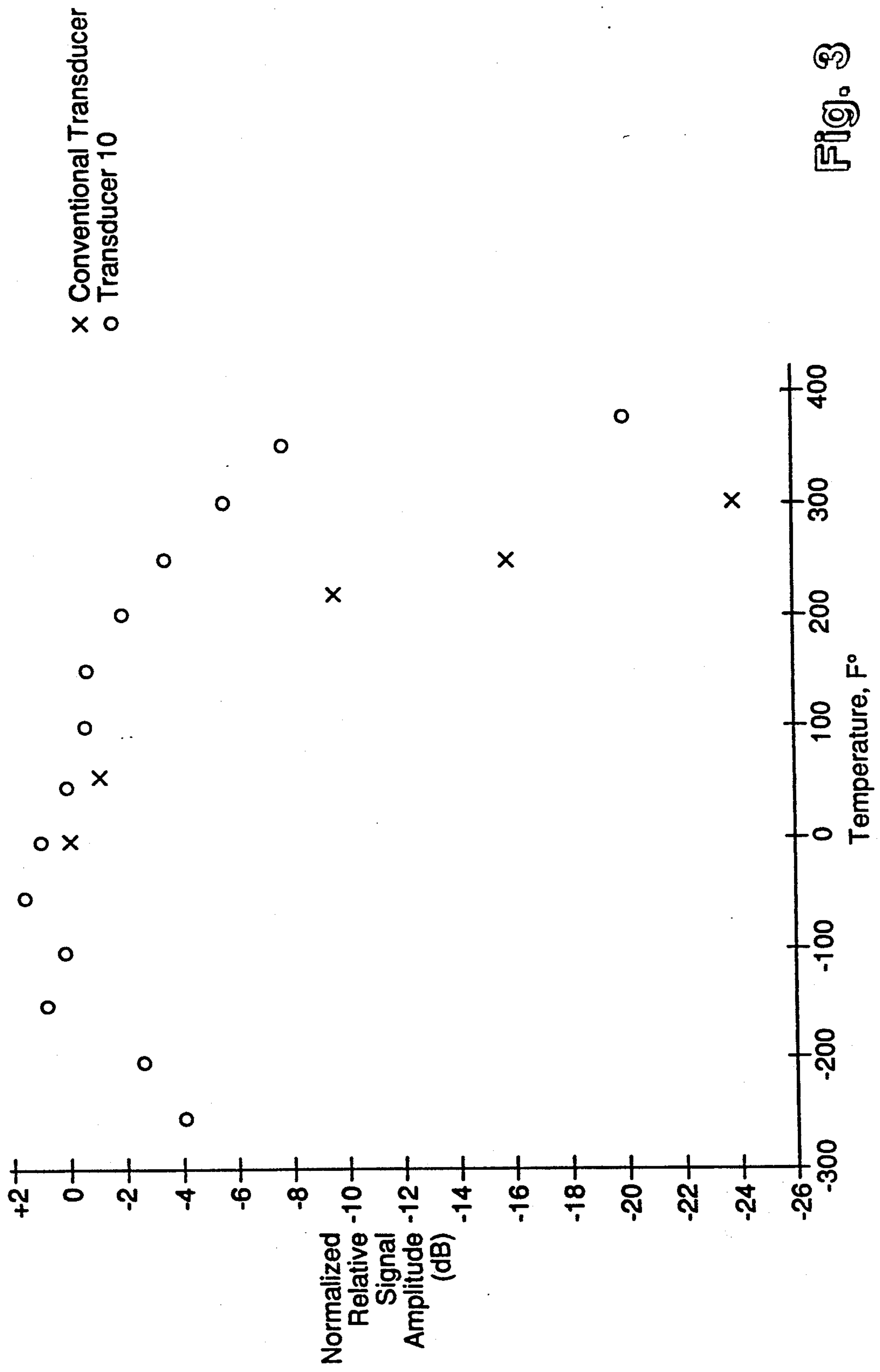
FIG. 3 is a plot of the effect of temperature extremes on the signal amplitude generated by the transducer.

FIG. 3 illustrates the temperature ranges of the environment within which transducer 10 may be operated. FIG. 3 also illustrates the range of operation for conventional piezoelectric transducers. As indicated, the range for transducer 10 is approximately −275 degrees Fahrenheit to +350 degrees Fahrenheit. In higher temperatures, i.e., from 0 to 350 degrees, the signal amplitude drops gradually and predictably, losing only about 8 dB. In lower temperatures, i.e., from 0 to −275 degrees, the signal amplitude decreases by only about 4 dB. In contrast, conventional transducers fail at temperatures below about 0 degrees and above about 160 degrees. Typically, these transducers use a wearface, a piezoelectric element, and a backing in some kind of housing.

A particularly useful application of transducer 10, because of its low temperature range, is in the area of cryogenic container inspections. Typically, during inspection, these containers are filled with cryogenic liquids, which may be used as an ultrasonic couplant.

OTHER EMBODIMENTS

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A transducer for use with ultrasonic test equipment, comprising:

a piezoelectric element having a front and a rear face;

a wearface that forms at least part of an outer surface of said transducer, attached to said front face of said piezoelectric element such that said piezoelectric element may generate or receive ultrasonic waves to or from a surrounding environment through said wearface;

a backing attached to the rear of said piezoelectric element;

an inner housing surrounding and enclosing the piezoelectric element, wearface, and backing;

wherein said piezoelectric element, said backing, and said inner housing are made from materials having similar coefficients of expansion; and an outer housing spaced apart from said inner housing.

2. The transducer of claim 1, wherein said piezoelectric element, said backing, and said inner housing are made from a ceramic material.

3. The transducer of claim 1, wherein said wearface has a coefficient of expansion similar to that of said piezoelectric element.

4. The transducer of claim 3, and further comprising a bond layer for attaching said wearface to said piezoelectric element.

5. The transducer of claim 3, wherein said wearface is made from a ceramic material.

6. The transducer of claim 1, wherein said backing is made from a mixture of ceramic material and tungsten.

7. The transducer of claim 1, wherein said piezoelectric element has the shape of a flat plate.

8. The transducer of claim 1, and further comprising a filler layer between said inner housing and said outer housing.

9. The transducer of claim 1, and further comprising electrical connection means for conducting electrical signals generated by said piezoelectric element, wherein said electrical connection means are imbedded in said transducer.

10. A method of making a piezoelectric element for generating and receiving pressure waves, comprising the steps of:

mounting a backing material to a back face of a piezoelectric element;

mounting a wearface to a front face of a piezoelectric element;

enclosing said piezoelectric element, and backing material in an inner housing;

wherein said backing material and inner housing have coefficients of expansion that are similar to that of said piezoelectric element; and containing said inner housing inside an outer housing.

* * * * *